United States Patent
DeGroot et al.

(10) Patent No.: US 7,202,858 B2
(45) Date of Patent: Apr. 10, 2007

(54) PROCESSING ANALOG TO DIGITAL CONVERTER SIGNALS TO A TOUCH SCREEN DISPLAY

(75) Inventors: Jeffrey J. DeGroot, Onalaska, WI (US); Thomas G. Krajewski, La Crosse, WI (US)

(73) Assignee: American Standard International Inc., New York, NY (US)

( * ) Notice: Subject to any disclaimer, the term of this patent is extended or adjusted under 35 U.S.C. 154(b) by 655 days.

(21) Appl. No.: 10/779,926

(22) Filed: Feb. 17, 2004

(65) Prior Publication Data

US 2004/0160426 A1   Aug. 19, 2004

(51) Int. Cl.
   *G09G 5/00* (2006.01)
(52) U.S. Cl. .................. 345/173; 345/90; 345/156; 345/204; 178/18.01; 178/18.1; 341/5
(58) Field of Classification Search .............. 345/90, 345/156, 173, 204; 178/18.01, 18.1; 341/5
See application file for complete search history.

(56) References Cited

U.S. PATENT DOCUMENTS

| 4,145,748 | A |   | 3/1979 | Eichelberger et al. |   |
|---|---|---|---|---|---|
| 5,241,139 | A | * | 8/1993 | Gungl et al. ................. | 345/173 |
| 5,283,559 | A |   | 2/1994 | Kalendra et al. |   |
| 5,543,588 | A |   | 8/1996 | Bisset et al. |   |
| 5,644,308 | A |   | 7/1997 | Kerth et al. |   |
| 5,717,321 | A |   | 2/1998 | Kerth et al. |   |
| 5,751,276 | A |   | 5/1998 | Shih |   |
| 5,796,389 | A | * | 8/1998 | Bertram et al. ............. | 345/173 |
| 5,877,458 | A |   | 3/1999 | Flowers |   |
| 6,016,140 | A |   | 1/2000 | Blouin et al. |   |
| 6,246,394 | B1 |  | 6/2001 | Kalthoff et al. |   |

OTHER PUBLICATIONS

The Bergquist Company, "RTS™ Resistive Touch System" brochure.
ECN, "Human Input Devices Based on Resistive Touch Screen Sensors", May 15, 2001.
ECN, "Resistive Touchscreen Controller ADCs—Theory of Operation & Application Challenges", Jun. 2001.

* cited by examiner

*Primary Examiner*—Bipin Shalwala
*Assistant Examiner*—Vincent E. Kovalick
(74) *Attorney, Agent, or Firm*—William J. Beres; William O'Driscoll

(57) ABSTRACT

An enhanced touch-screen display system is disclosed for generating pixel coordinate estimates corresponding to a location on a display screen touched by a user. The system is an analog resistive touch-screen display system having a processor and associated software algorithms to allow for the calibration and validation of pixel coordinate estimates as an integral part of the real-time generation of the pixel coordinate estimates. Multiple calibrated pixel coordinate estimates are generated and processed at a pre-defined sampling rate to determine a valid pixel position to minimize sampling delays due to settling times. The x-axis position is also validated before the system attempts to generate a y-axis position to avoid the wasted time for generating y-axis estimates when x-axis estimates are corrupted. Noisy estimates are inherently reduced in the touch-screen display system by providing shunts across certain drivers in the system that also allow for detection of a "no touch" state.

18 Claims, 5 Drawing Sheets

PROCESSING ANALOG TO DIGITAL CONVERTER SIGNALS TO A TOUCH SCREEN DISPLAY

BACKGROUND OF THE INVENTION

This disclosed embodiment relates to a touch-screen display system for generating pixel coordinate estimates responsive to a user touching (pressing a key on) a display screen, and more particularly relates to improving the efficiency of generating such pixel coordinate estimates through enhanced techniques of calibration and validation of the estimates.

In a typical touch-screen display system, an x-axis coordinate position is sampled and then a y-axis coordinate position is sampled to indicate a pixel location where a user has touched the display screen. If the samples are corrupted by noise or by drift of some parameter of the system, then these samples yield an incorrect indication of where the user has touched the display screen.

Typically, the system is controlled to insert timing delays into the sampling process to allow the various x-axis and y-axis drivers to settle out as they are switched back and forth between x and y so noisy estimates are avoided.

Calibration routines are typically run which require the user to assist in this calibration effort by touching various known locations on the display screen and/or require implementing look-up tables and pre-calibrated cables in the system.

Also, in many touch-screen display systems, only an active touch of the display screen (or apparent touch caused by system noise) is detected. Detecting the absence of a touch (key press) and reducing the possibility of a false touch caused by noise is often just as desirable as detecting the position of an active touch.

U.S. Pat. No. 6,246,394 to Kalthoff et al. includes a conventional analog resistive touch-screen display assembly 2. It employs a 4-wire arrangement for taking measurements. U.S. Pat. No. 6,016,140 to Blouin et al. is directed to a system and method that uses look-up tables and calibration cables for calibration. U.S. Pat. No. 5,751,276 to Shih is directed to a method for calibrating touch panel displays using mapping transfer information. U.S. Pat. No. 5,241,139 to Gungl et al. determines the position of a member contacting a touch screen by tracking coordinates. U.S. Pat. No. 4,145,748 to Eichelberger et al. includes a charge transfer analog-to-digital converter for a digital reading obtained for a "no touch" condition stored in memory, comparing digital readings from each pad to the "no touch" reading stored in memory.

An approach to generating pixel coordinate estimates that minimizes sampling delays, reduces corruption of estimates due to noise, eliminates the need for user-interactive calibration, enhances ESD protection, or provides more than one of these features is desired.

BRIEF SUMMARY OF THE INVENTION

One aspect of the disclosed embodiment is a calibrated touch-screen display system for generating a pixel coordinate estimate responsive to a user touching a display screen. In other words, the system detects that the screen has been touched, and determines "coordinates," such as a vertical position and a horizontal position on the screen, indicating where it has been touched.

"Pixels" are the elements or building blocks arranged on the screen to display an image. The pixels may be displayed on, for example, an LCD display or other active display, or may be the coordinates of features on a passive display, such as a panel with permanent indicia applied to it.

Apparatus for calibrating the touch-screen display system is provided. "Calibrating" means determining and correcting errors in the estimated coordinates, so the measured coordinates are accurate. This apparatus includes a processor that uses the digital signals it receives from the touch-screen to produce calibrated pixel coordinate estimates. This calibration is performed during real-time generation of the pixel coordinate estimates without the need for any extraordinary input by a user of the system. In other words, the calibrated estimates are produced essentially at the same time the coordinate estimates are produced, so the system automatically recalibrates itself as it is used. Automatic calibration reduces or eliminates the need for manual recalibration.

Another aspect of the disclosed embodiment is an apparatus for generating and processing multiple calibrated pixel coordinate estimates at a pre-defined sampling rate to determine valid pixel position in order to minimize sampling delays due to settling times. The x-axis position is validated before the system attempts to generate a y-axis position so as not to waste time generating y-axis estimates when x-axis estimates are not valid. Shunts are designed in conjunction with the pre-defined sampling rate to establish pre-determined settling times (corresponding to discharge rates of capacitance on the analog interfaces) such that voltage levels of the analog interfaces can be sampled and processed by the system to indicate a "no touch" state of the system.

A method for calibrating the touch-screen display system is provided. This method includes generating digital signals to produce calibrated pixel coordinate estimates. This calibration is performed during real-time generation of the pixel coordinate estimates without the need for any extraordinary input by a user of the system. In other words, the calibrated estimates are produced essentially at the same time the coordinate estimates are produced, so the system automatically recalibrates itself as it is used.

Another aspect of the disclosed embodiment is a method for generating and processing multiple calibrated pixel coordinate estimates at a pre-defined sampling rate to determine valid pixel position in order to minimize sampling delays due to settling times. The x-axis position is validated before the system attempts to generate a y-axis position so as not to waste time generating y-axis estimates when x-axis estimates are not valid. Noisy estimates are inherently reduced in the touch-screen display system employing unique shunting techniques in conjunction with driving techniques in the system. These shunting techniques are used in conjunction with a pre-defined sampling rate to establish pre-determined settling times (corresponding to discharge rates of capacitance on the analog interfaces) such that voltage levels on these analog interfaces can be sampled and processed by the system to indicate a "no touch" state of the system.

By using the foregoing techniques, an approach to generating pixel coordinate estimates that minimizes sampling delays, reduces corruption of estimates due to noise, enhances ESD protection, and eliminates the need for user-interactive calibration is achieved.

A further aspect of the invention is a method of determining a touch screen coordinate for a touch screen. The method comprises the steps of: turning on the driver of the coordinate to be measured; measuring minimum, maximum, and raw position data for the coordinate being measured; and determining the coordinate position as a function of the raw position in relation to a coordinate range.

An additional aspect of the invention is an apparatus determining a touch screen coordinate for a touch screen. The apparatus comprises a controller turning on the driver of the coordinate to be measured; circuitry on devices measuring minimum, maximum, and raw position data for the coordinate being measured; and a controller determining the coordinate position as a function of the raw position in relation to a coordinate range.

Yet another aspect of the invention is a method of determining whether or not a touch screen has been touched. The method comprises the steps of: providing an analog to digital converter which supplies an analog to digital reading; reading a minimum bit level; determining whether the reading is smaller than a minimum bit level; and determining the absence of a user touch if the reading is less than the minimum bit level.

Still another aspect of the invention is apparatus determining whether or not a touch screen has been touched. The apparatus comprises circuitry providing an analog to digital reading from an analog to digital converter; a controller reading a minimum bit level; a computing element determining whether the reading is smaller than the minimum bit level; and a controlling element determining the absence of a user touch if the modified reading is less than a minimum bit level.

A yet further aspect of the invention is a method of speeding up the reading of analog to digital converter signals to a touch screen. The method comprises the steps of: reading a first coordinate of a coordinate pair at a first time; consecutively reading the same coordinate at a second time; determining if the absolute value of the difference between the first coordinate and the consecutive coordinate is less than a predetermined value; and quantifying, responsive to the difference determining step the coordinate position as a function of the first or the consecutive coordinate.

A still further aspect of the invention is apparatus speeding up the reading of analog to digital converter signals to a touch screen. The apparatus comprises circuitry reading a first coordinate of a coordinate pair at a first time; circuitry consecutively reading the same coordinate at a second time; a controller element determining if the absolute value of the difference between the first coordinate and the consecutive coordinate is less than a predetermined value; and a computing element, response to the controller element quantifying the coordinate position as a function of the first or the consecutive coordinate.

A yet further aspect of the invention is a method of determining whether or not a touch screen has been touched. The method comprises the steps of: reading a first coordinate of a coordinate pair at a first time; consecutively reading the same coordinate at a second time; determining if the absolute value of the difference between the first coordinate and the consecutive coordinate is less than a predetermined value; and quantifying, responsive to the difference determining step the coordinate position as a function of the first or the consecutive coordinate.

A still further aspect of the invention is apparatus determining whether or not a touch screen has been touched. The apparatus comprises circuitry reading a first coordinate of a coordinate pair at a first time; circuitry consecutively reading the same coordinate at a second time; a controller element determining if the absolute value of the difference between the first coordinate and the consecutive coordinate is less than a predetermined value; and a computing element, response to the controller element quantifying the coordinate position as a function of the first or the consecutive coordinate.

Another aspect of the invention is in an apparatus for enabling detection of a "no touch" state of a touch-screen display system for generating pixel coordinate estimates responsive to a user touching a display screen. The touch-screen display system comprises: at least one bus bar; at least one driver electrically connected to said at least one bus bar to selectively switch the at least one bus bar between at least two of a plurality of electrical potentials wherein the at least one driver is selected to have an off state impedance establishing a pre-determined discharge rate.

Yet another aspect of the invention is in an apparatus for enabling detection of a "no touch" state of a touch-screen display system for generating pixel coordinate estimates responsive to a user touching a display screen. The touch-screen display system comprises: at least one bus bar; at least one driver electrically connected to said at least one bus bar to selectively switch the at least one bus bar between at least two of a plurality of electrical potentials wherein the at least one driver is controlled to establish pre-determined discharge rates.

Still another aspect of the invention is a method of determining whether or not a touch screen has been touched. The method comprises the steps of: providing an analog to digital converter which supplies an analog to digital reading; reading a maximum bit level; determining whether the reading is smaller than the maximum bit level; and determining the absence of a user touch if the modified reading is less than the maximum bit level.

An additional aspect of the invention is an apparatus determining whether or not a touch screen has been touched. The apparatus comprises: circuitry or the like providing an analog to digital reading from an analog to digital converter; circuitry or the like reading a maximum bit level; circuitry or the like determining whether the reading is smaller than the maximum bit level; and circuitry or the like determining the absence of a user touch if the reading is less than a maximum bit level.

DETAILED DESCRIPTION OF THE INVENTION

The features of one embodiment enable improved efficiency in generating pixel coordinate estimates through enhanced techniques of calibration and validation of the estimates. As used in this specification and claims, a pixel coordinate estimate corresponds to that pixel position on the touch-screen display that is an estimate of where a user has touched the screen. This embodiment offers a more efficient approach to generating pixel coordinate estimates that minimizes delays, reduces corruption of estimates due to noise, enhances ESD protection, and eliminates the need for user-interactive calibration. The pixel coordinate estimates are characterized as digital signal values in a processor of the touch-screen display system. These digital signal values are generated, in part, from a set of analog voltage levels, sampled from analog resistive screens in the touch-screen display system, corresponding to the position of where a user has touched the display screen.

Figure 1:
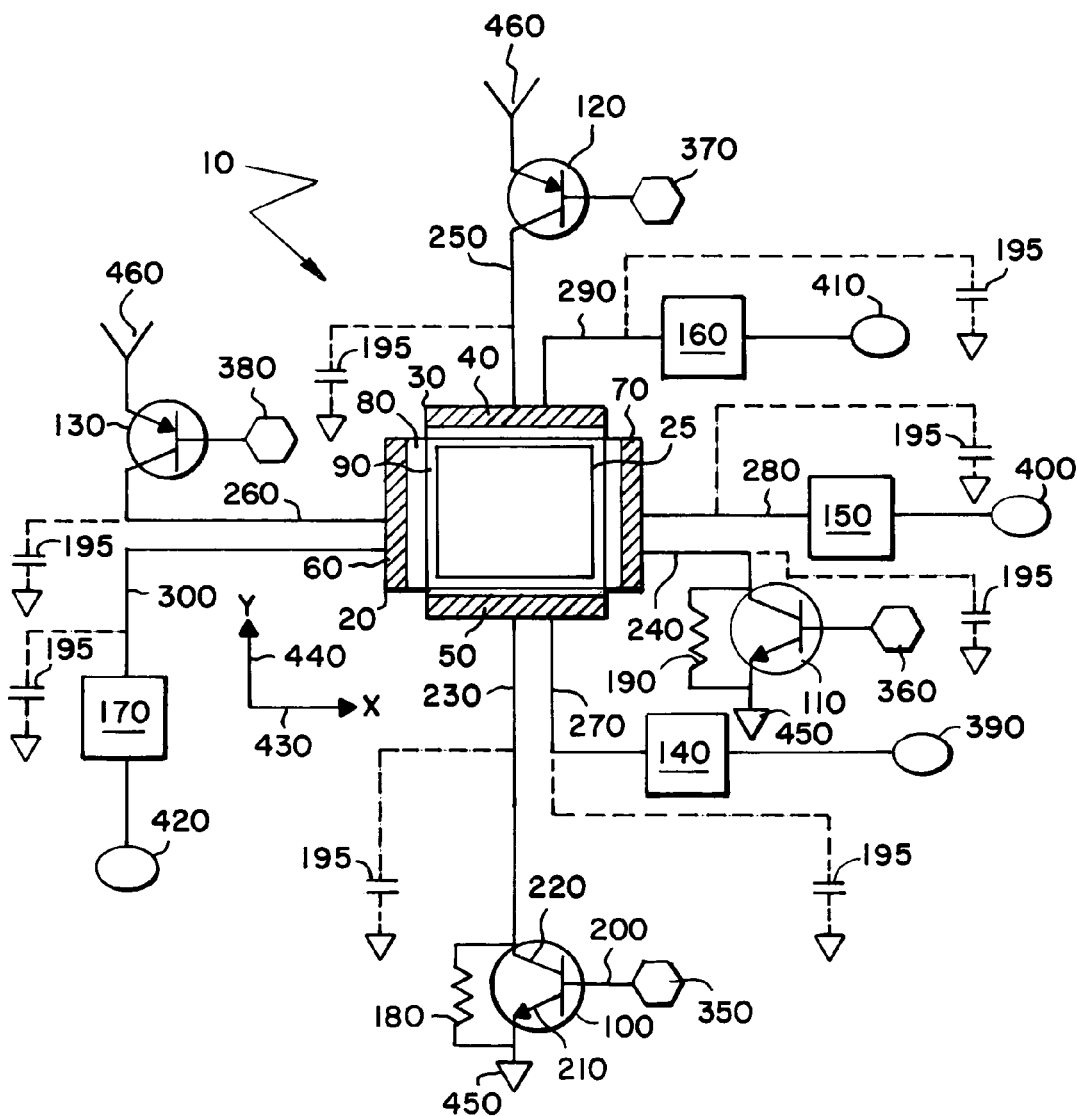
FIG. 1 is a schematic block diagram of certain elements of the touch-screen display system made in accordance with the disclosed embodiment, particularly showing the shunts and the 8-wire sampling configuration.

FIG. 1 is a schematic block diagram of certain elements of the touch-screen display system 10 made in accordance with one embodiment of the invention. These elements comprise analog resistive screens 20 and 30 that include conductive bus bars 40, 50, 60, and 70, and resistive materials 80 and 90. An active area 25 of the screens 20, 30 is defined by the overlap of the screens 20, 30 as the display screen, and an active area of the display is shown by reference numeral 35. Additional elements comprise drivers 100, 110, 120, and 130, analog-to-digital converters 140, 150, 160, and 170, and shunts 180 and 190 and capacitors 195. The capacitors 195 may be inherent or added physical elements.

Referring to FIG. 1, the resistive material 90 of the analog resistive screen 30 is electrically connected between a top bus bar 40 and a bottom bus bar 50. The resistive material 80 of the analog resistive screen 20 is electrically connected between a left bus bar 60 and a right bus bar 70. Each bus bar is electrically connected to an associated driver 100, 110, 120, 130 and an analog-to-digital converter 140, 150, 160, 170 as shown in FIG. 1. In this embodiment of the invention, the drivers 100, 110, 120, 130 are bi-polar transistors each comprising a base terminal 200, an emitter terminal 210, and a collector terminal 220. The drivers are electrically connected to the associated bus bars at the collector terminals 220 and provide reference signals through reference signal interfaces 230, 240, 250, and 260 to the bus bars when the drivers are turned on. The analog-to-digital converters are electrically connected to the bus bars through analog interfaces 270, 280, 290, and 300.

Figure 2:
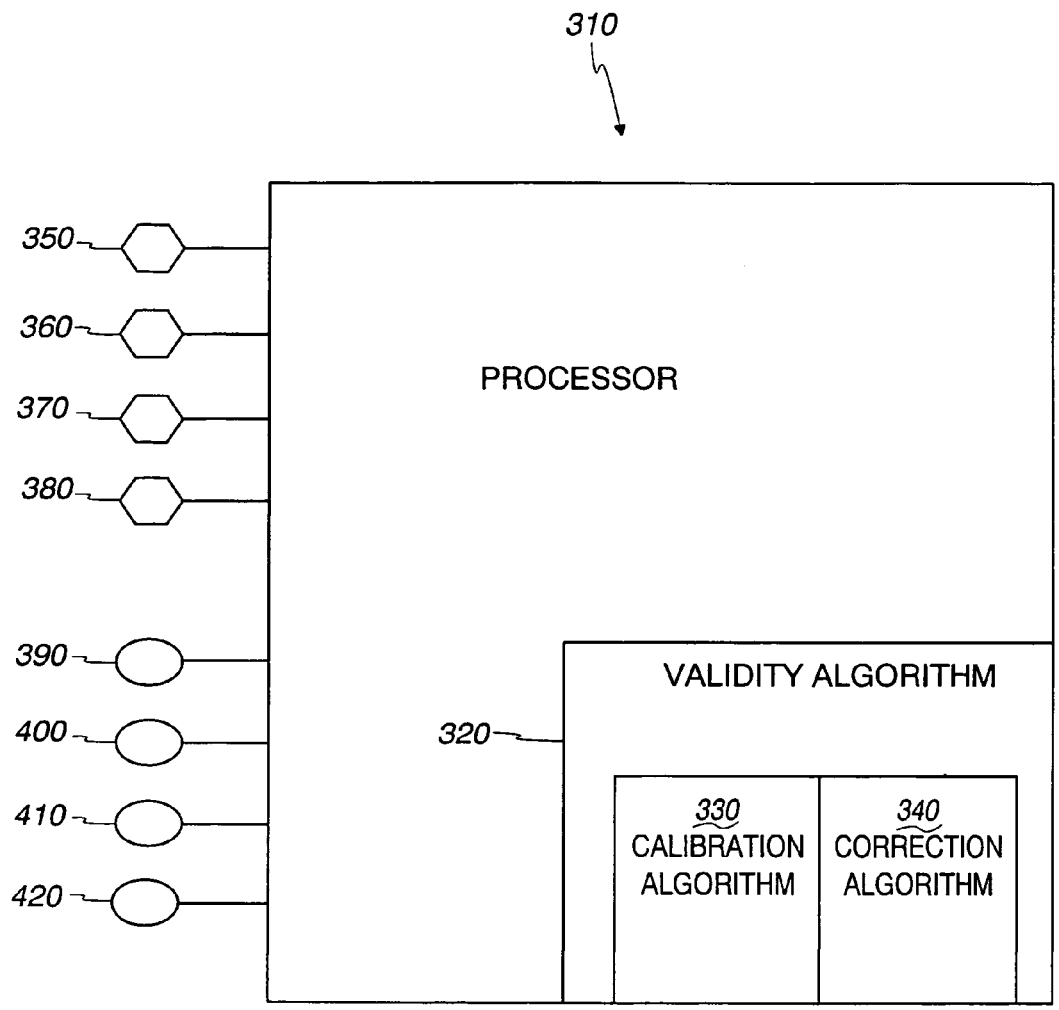
FIG. 2 is a schematic block diagram of the processor of the touch-screen display system with certain associated software algorithms including a validity algorithm, calibration algorithm, and correction algorithm. This processor interfaces to the elements in FIG. 1.

FIG. 2 is a schematic block diagram of the processor 310 of the touch-screen display system with its associated software algorithms comprising a validity algorithm 320, a calibration algorithm 330, and a correction algorithm 340. This processor 310 interfaces to the elements in FIG. 1.

The base terminals 200 of the drivers 100, 110, 120, and 130 interface to the processor 310 through driver signal interfaces 350, 360, 370, and 380 as shown in FIGS. 1 and 2. The analog-to-digital converters 140, 150, 160, and 170 interface to the processor 310 through digital signal interfaces 390, 400, 410, and 420.

The shunt 180 electrically connects across the driver 100 at its emitter terminal 210 and collector terminal 220. The shunt 190 electrically connects across the driver 110 at its emitter terminal 210 and collector terminal 220. In this embodiment of the invention, the shunts 180 and 190 are a resistor and capacitor 195 in parallel but could be resistors or some other combination of components to establish pre-determined discharge rates which determine settling times on the analog interfaces. Alternatively, these components may not be needed if either low side or the high drivers 100, 110, 120, 130 are selected to have an appropriate off state impedance to establish pre-determined discharge or charge rates or if the low side or high drivers 100, 110, 120 130 are controlled to establish pre-determined discharge or charge rates. Also, the shunts 180, 190 could be placed in parallel to the high side drivers 120, 130 or the low side drivers 100, 110.

The eight signal interfaces 230–300 form an 8-wire configuration that allows for alternate sampling of analog voltage signals and reference signals with only one analog-to-digital converter/driver pair for each bus bar.

In a touch-screen display system of one embodiment of the invention, a user presses at a particular location (usually represented as a key) on a display screen. The system samples an x-axis 430 and then a y-axis 440 of the display screen to determine the pixel coordinate locations of where the screen is touched. In the present invention, the x sample is validated before the y sample is examined.

Referring to FIGS. 1 and 2, the processor 310 drives a first axis of the touch-screen display system 10 such as the horizontal or x-axis 430 by turning on the drivers 110 and 130. At this time the drivers 100 and 120, corresponding to the vertical or y-axis 440, are turned off by the processor 310. When the driver 110 is turned on, it establishes a low impedance reference path through the reference signal interface 240 from the right bus bar 70 to a ground reference 450. When the driver 130 is turned on, it provides a voltage reference through the voltage reference interface 460 to the left bus bar 60 through the reference signal interface 260.

The voltage reference applied to the left bus bar 60 and the ground reference applied to the right bus bar 70 in conjunction with the resistive material 80 creates a varying voltage potential with respect to the ground reference 450 across the analog resistive screen 20 at different points along the x-axis 430. When a user touches the display screen, the analog resistive screen 30 makes electrical contact with the analog resistive screen 20 at a defined point having a particular x-y pixel location. The analog resistive screen 30 is then at the voltage potential corresponding to that point along the x-axis 430 on the analog resistive screen 20. The bus bars 40 and 50 are, therefore, also at this same potential with respect to the ground reference 450, creating an analog voltage signal on analog interfaces 270 and 290.

Since the driver 120 is turned off, this allows for a correct measurement of the analog voltage signal on the upper bus bar 40 at the analog interface 290 by the analog-to-digital converter 160.

Alternatively, since the driver 100 is turned off, it allows a high impedance path to exist between the lower bus bar 50 and the ground reference 450 through the shunt 180. The shunt 180 has a high impedance value compared to the impedance of the analog resistive screen 20. This allows for a correct measurement of the analog voltage signal on the analog interface 270 by the analog-to-digital converter 140.

The analog voltage signal on the analog interface 290 is converted to a digital signal, known as $X_{raw}$, on the digital signal interface 410 and represents a pixel location along the x-axis 430 corresponding to where the user is touching the display screen. This digital signal $X_{raw}$ is read by a processor 310. The left bus bar voltage reference level, known as $X_{max}$, on the analog interface 300 and the right bus bar voltage reference level, known as $X_{min}$, on the analog interface 280 are also digitized and read by the processor 310 in a similar manner. The 8-wire configuration allows for the sampling of these signals and reference levels with only one analog-to-digital converter/driver pair for each bus bar.

Once the x-axis pixel position samples ($X_{raw}$, $X_{max}$, $X_{min}$) have been read and validated, the process is preferably repeated for the y-axis 440 in a similar manner where, now, the drivers 130 and 110 are turned off and the drivers 100 and 120 are turned on. A varying voltage potential is created across the analog resistive screen 30 and the analog resistive screen 20 is at the voltage potential corresponding to the pixel location along the y-axis 440 where the two screens are touching. In this way, the digital signal, known as $Y_{raw}$, on the digital interface 420 is generated and represents a pixel location along the y-axis 440 corresponding to where the user is touching the display screen. This digital signal $Y_{raw}$ is read by the processor 310. The upper bus bar voltage reference level, known as $Y_{max}$, on the analog interface 290 and the lower bus bar voltage reference level, known as $Y_{min}$, on the analog interface 270 are also digitized and read by the processor 310 in a similar manner.

Touch-screen display systems often need to be calibrated, for example, to eliminate errors in the pixel coordinate estimates introduced by drifting voltage references and ground references, or by changes in the resistive characteristics of the analog resistive material. Factors such as temperature, humidity, and aging can cause these undesirable effects. Another feature of the disclosed embodiment is the technique that is used for calibration. The previously described technique of sampling the signals and references ($X_{raw}$, $X_{max}$, $X_{min}$, $Y_{raw}$, $Y_{max}$, $Y_{min}$) allows for the calibration technique to be implemented since, by measuring the actual voltage levels on the analog resistive screens, any errors can be calibrated out as described below.

Figure 3:
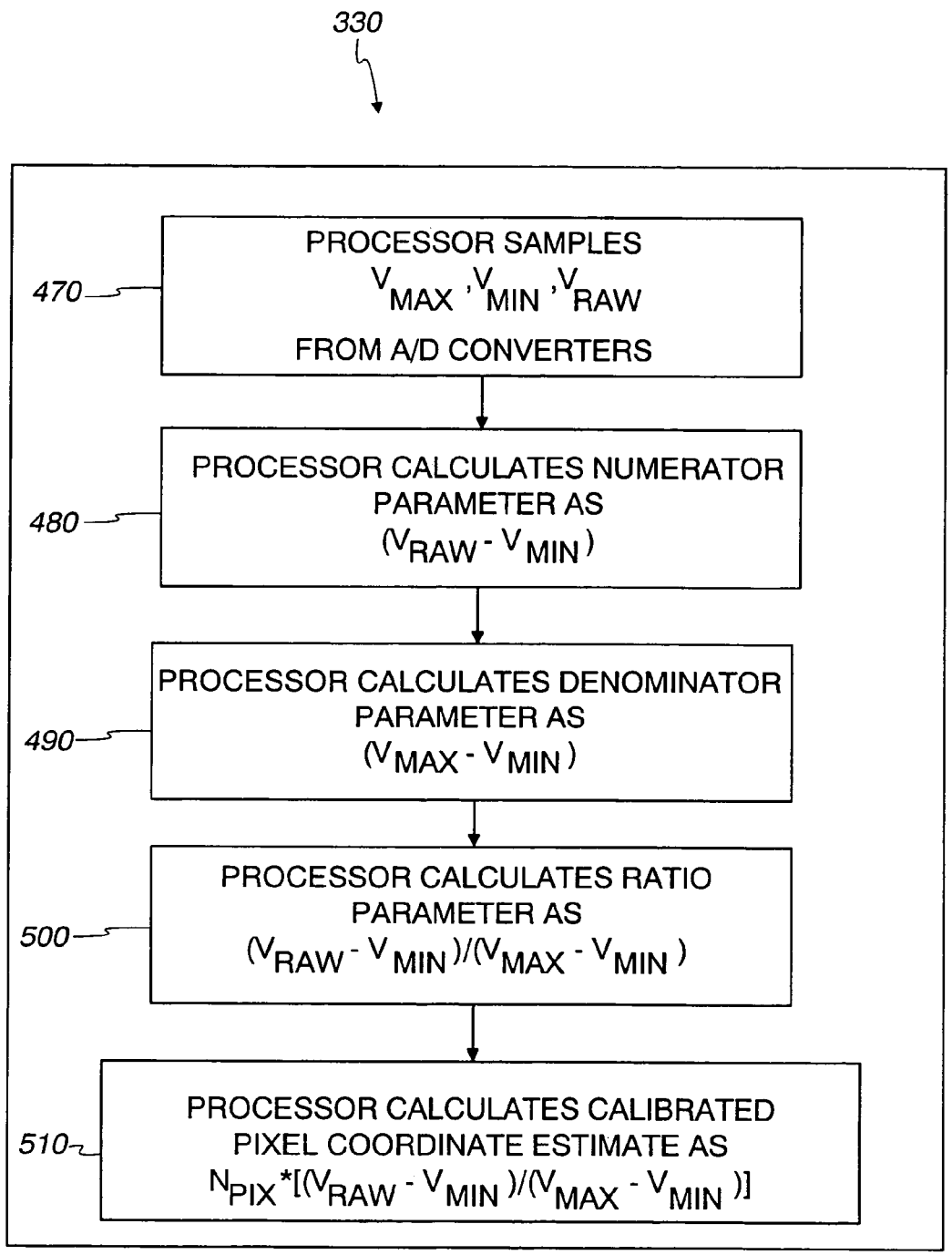
FIG. 3 is a flowchart of the calibration algorithm utilized by the processor shown in FIG. 2.

FIG. 3 is a flowchart showing the steps of the calibration algorithm 330 that is called by the validity algorithm 320 as part of its operation. In step 470 of the calibration algorithm 330, the processor 310 samples the signals and references for a particular driven axis such as signals and references $X_{raw}$, $X_{max}$, $X_{min}$ or signals and references $Y_{raw}$, $Y_{max}$, $Y_{min}$ represented more generally in the flowchart as $V_{raw}$, $V_{max}$, $V_{min}$. In step 480, the processor 310 calculates a numerator parameter as $(V_{raw}-V_{min})$ representing the voltage level at the pixel coordinate position on the analog resistive screen with respect to the ground reference. In step 490, the processor 310 calculates a denominator parameter as $(V_{max}-V_{min})$ representing the actual voltage potential (or range) applied across the analog resistive screen. In step 500, the processor 310 calculates a ratio parameter as the numerator parameter divided by the denominator parameter or $(V_{raw}-V_{min})/(V_{max}-V_{min})$. This ratio parameter represents the percentage of how far along the axis the screen was touched by the user. As a final step 510, the processor 310 multiplies the ratio parameter by the known number of pixels $N_{pix}$ across the axis of the screen. This yields a calibrated pixel coordinate estimate in units of pixels for the axis. This process can be done in real-time during normal operation of the touch-screen display system and does not require the user to touch the display screen at any pre-defined locations. There is no calibration process that needs to be done separate from normal operation. The calibration process is transparent to the user. This calibration process is accomplished for each axis of the touch-screen display system.

Even though the pixel coordinate estimates have errors, for example, due to drift calibrated out by the calibration algorithm 330, there can still be errors due to noise. One way to minimize noise due to such things as settling times of the drivers is to insert significant delay times into the sampling process to allow the drivers and various signals to settle out. This is inefficient and wastes time and does not necessarily eliminate noise from other sources.

Figure 4:
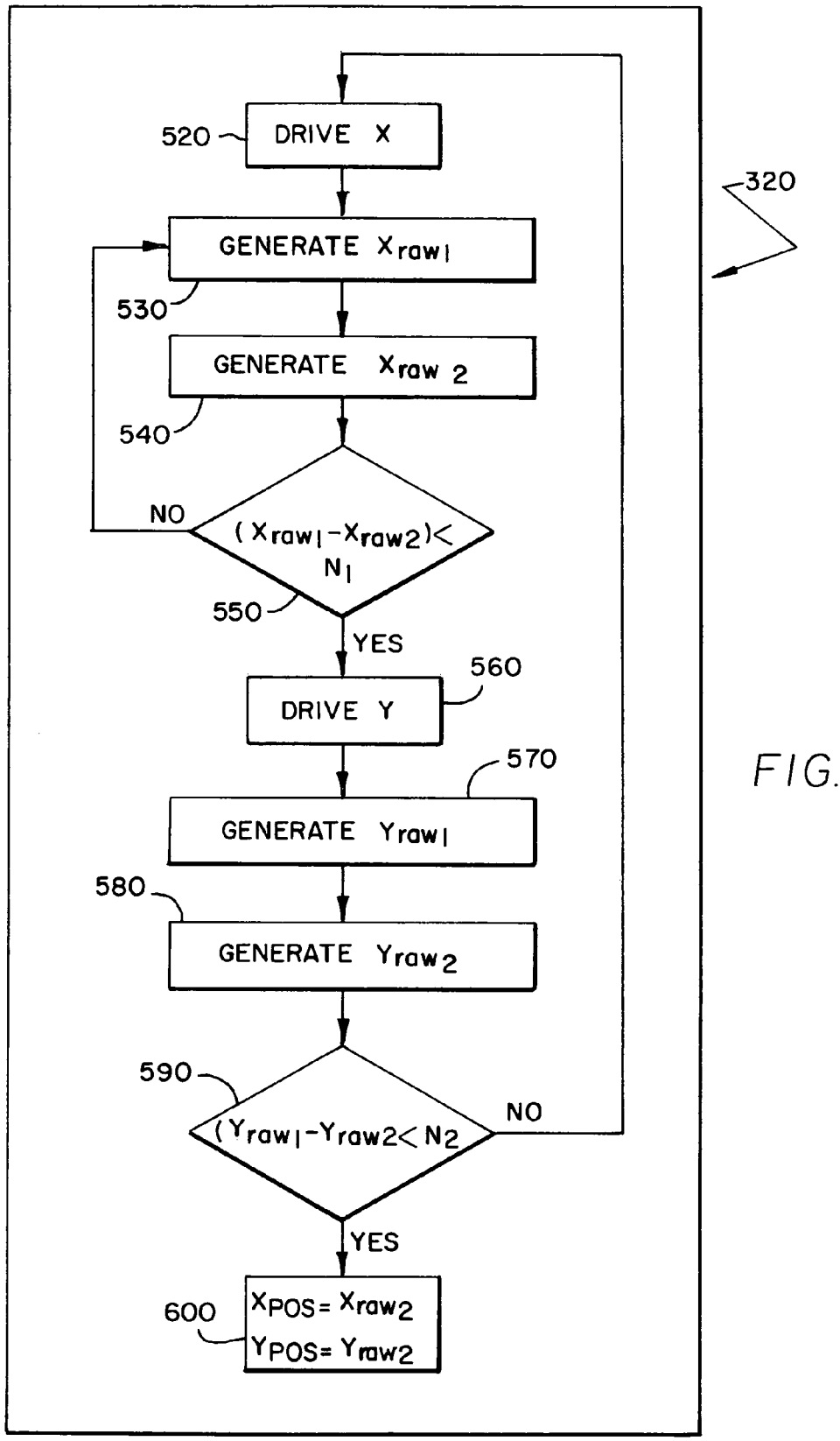
FIG. 4 is a flowchart of the validity algorithm utilized by the processor shown in FIG. 2.
Figure 5:
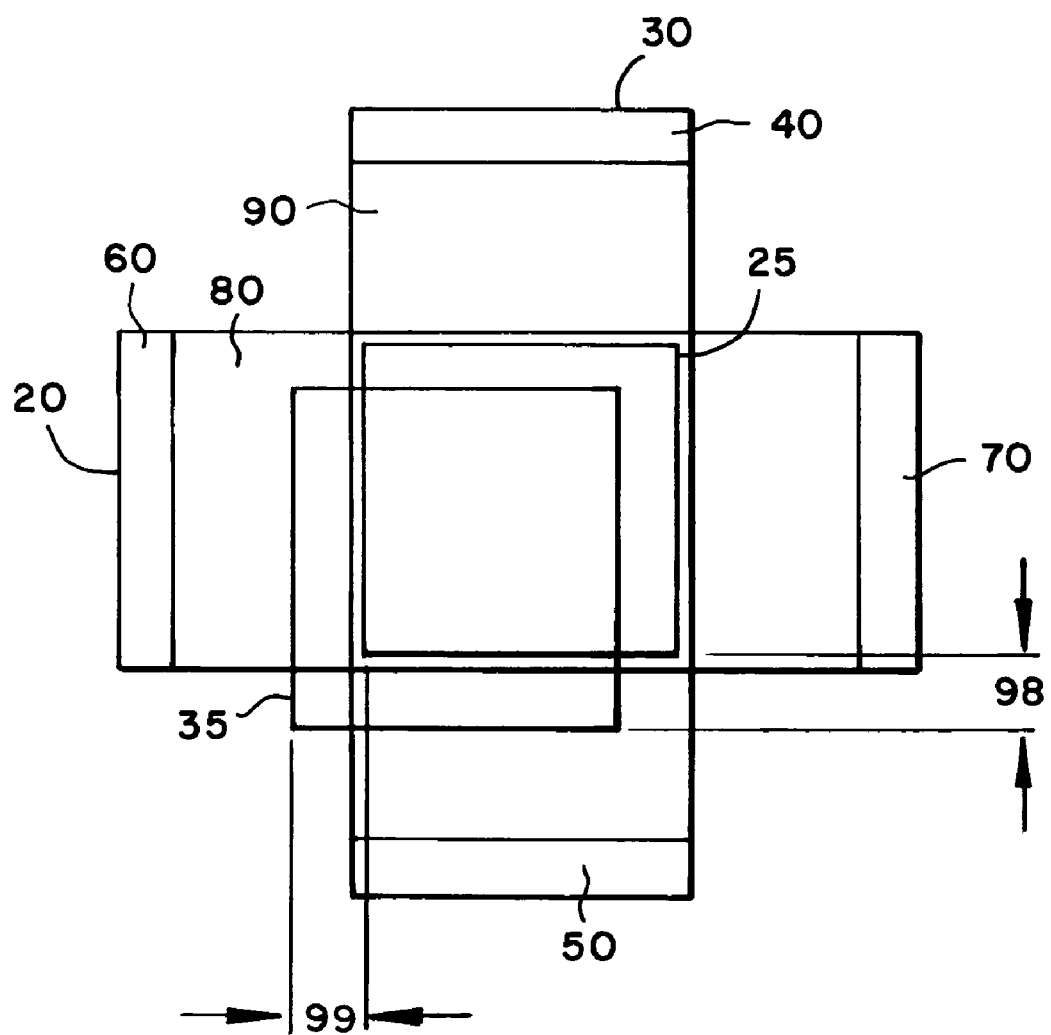
FIG. 5 is a schematic block diagram of the active areas of the touch screen display and analog resistive screens of FIG. 1.

FIG. 4 is a flowchart of a validity algorithm 320 that is used to control how pixel coordinate estimates are sampled and validated as being good estimates. This algorithm has the effect of minimizing sampling delay times and eliminating noisy estimates that cause errors in determining the pixel position. In steps 520, 530, and 540 of the validity algorithm 320, the processor 310 drives the x-axis 430 as previously described by turning on the drivers 110 and 130 to determine a value for $X_{pos}$. In determining $X_{pos}$, a first calibrated pixel coordinate estimate $X_{raw1}$ and a second calibrated pixel coordinate estimate $X_{raw2}$ are generated, preferably consecutively, by the processor 310 using the calibration algorithm 330. Although the preferred embodiment is described in terms of two samples or estimates, a person of ordinary skill in the art will recognize that three or more samples may be also used, and either averaged, prorated, or combined or selected in any conventional manner. These estimates are separated in time by a pre-determined sampling interval. In step 550, the processor generates a first comparison parameter value as $|X_{raw1}-X_{raw2}|$ and compares this first comparison parameter value to a pre-determined first threshold value $N_1$. If the first comparison parameter value is greater than $N_1$, then the estimates are defined to be invalid and the processor 310 makes another attempt to generate a valid estimate. If the first comparison parameter value is less than $N_1$, then the processor preferably takes $X_{raw2}$ as the valid pixel coordinate estimate, now $X_{pos}$, for the x-axis and proceeds to generate y-axis estimates. Alternately, $X_{raw1}$ may be selected as the valid pixel coordinates, or $X_{raw1}$ and $X_{raw2}$ may be combined either pro rata or using any other formula or function. The processor makes, at most, a pre-determined number of attempts to generate a valid estimate for the x-axis. This pre-determined number of attempts is typically two in the disclosed embodiment but may be varied to three or more. If, after this pre-determined number of attempts, a valid x-axis estimate is not determined, then the processor defines a "no touch" state and generates a "no touch" parameter value to indicate the "no touch" state. This "no touch" state is interpreted as the display screen not being touched by a user.

The pre-determined sampling interval, the shunt 180, and the predetermined difference $N_1$, are all chosen such that the resultant settling time (corresponding to a discharge rate of the capacitors 195 associated with the corresponding analog interfaces and drivers) allows a distinguishing voltage difference between two successive samples at the analog interface 290, and therefore at the input to the analog-to-digital converter 160, when the display screen is not being touched. This voltage difference between samples when the display screen 25 is not being touched is different than the voltage difference between samples when the display screen 25 is being touched because the settling time (discharge rate) is changed when the display has been touched. This is because, when the display screen 25 is being touched, the sensing screen is actively being charged and the settling time is based much more on the low impedance of the drivers than the higher impedance of the shunt. Therefore, the shunt 180 or 190, in conjunction with the sampling interval, $N_1$, and validity algorithm allows determination of a valid estimate of a "no touch" state. By generating at least two estimates, the sampling time interval between the estimates can be pre-defined such that the need for significant delay times is eliminated when generating the estimates. This also allows inexpensive capacitance 195 to be added to the analog interfaces and drivers for enhanced ESD protection, increasing the settling times without increasing the delay before sampling. This added capacitance increases the settling times of the analog interfaces but the method of sampling and validating the samples eliminates the need to wait until after these settling times before sampling. In this way, more expensive components for ESD protection such as zener diodes can be avoided.

Once a valid x-axis pixel coordinate estimate has been determined, the processor 310 then attempts to generate a valid y-axis pixel coordinate estimate in a similar manner to determine a value for $Y_{pos}$. Steps 560–600 in the validity algorithm 320 illustrate this process. A first estimate $Y_{raw1}$ is generated along with a second estimate $Y_{raw2}$. Although the preferred embodiment is described in terms of two samples or estimates, a person of ordinary skill in the art will recognize that three or more samples may be also used, and either averaged, prorated, or combined or selected in any conventional manner. A second comparison parameter value is calculated and compared to a second threshold value $N_2$. This threshold value $N_2$ may be the same as threshold value $N_1$ or not, depending on the exact implementation. $Y_{raw2}$ is preferably taken as the valid y-axis estimate, now $Y_{pos}$, if the second comparison value is less than $N_2$, otherwise the processor attempts to generate valid pixel coordinate value estimates by starting over at step 520 to again determine a valid x-axis estimate before determining a valid y-axis estimate. Again, after a pre-determined number of attempts, a "no touch" state is defined and a "no touch" parameter value is generated. Similarly, the pre-determined sampling interval, the shunt 190, and the predetermined difference $N_2$ are all chosen such that the resultant settling time (corresponding to a discharge rate of the capacitance associated with the corresponding analog interfaces) allows a distinguishing voltage difference between two successive samples at the analog interface 300, and therefore at the input to the analog-to-digital converter 170, when the display screen is not being touched. Again, this allows inexpensive capacitance 195 to be added to the analog interfaces and drivers for enhanced ESD protection, increasing the settling times without increasing the wait before sampling.

If the active areas 25, 35 of the display of the touch-screen display system and analog resistive screens line up and are equivalent by design and the bus bars are at the edges of the active areas of the screens, then the previously calculated calibrated pixel coordinate estimates do not need any further correction. In many touch-screen display systems, however, the bus bars are not at the edge of the active areas of the screens; there is some lead-in distance between the bus bar and the active areas of the screens. Additionally, if there is an offset 98, 99 between the edges of the active areas of the screens and the display of the touch-screen display system, then further corrections to the calibrated pixel coordinate estimates are made. Generally, these offsets 98, 99 are known or determined at time of manufacture but alternatively the offsets could be determined and entered at a later date.

In this embodiment of the invention, these corrections are made by the correction algorithm 340 to the calibrated pixel coordinate estimates as described below.

The correction factors for the distance between the bus bars and the active area for the x-axis are $X_{Lcorrection}$=(the greater of the distance between the left bus bar and the analog resistive screen active area or the distance between the left bus bar and the display active area)/distance between the left and right bus bars, and $X_{Rcorrection}$=(the greater of distance between right bus bar and analog resistive screen active area or distance between right bus bar and display active area)/distance between the left and right bus bars.

These two correction factors can be normalized to analog-to-digital converter bits by multiplying them by $X_{range}$ which equals $(X_{max}-X_{min}3)$, yielding the equation $X$ position (pixels)=pixels_$ux*(X_{pos}-X_{min}-(X_{range}*X_{Lcorrection}))/(X_{range}*(1-X_{Lcorrection}-X_{Rcorrection})$ where pixels_ux is the number of display pixels under the active area of the analog resistive screen along the x-axis.

For the y-axis the correction factors are $Y_{Tcorrection}$=(the greater of the distance between the top bus bar and the analog resistive screen active area or the distance between the top bus bar and the display active area)/the distance between the top and bottom bus bars, and $Y_{Bcorrection}$=(the greater of the distance between the bottom bus bar and the analog resistive screen active area or the distance between the bottom bus bar and the display active area)/the distance between the top and bottom bus bars.

These two correction factors can be normalized to analog-to-digital converter bits by multiplying them by $Y_{range}$ which equals $(Y_{max}-Y_{min})$, yielding the equation $Y$ position (pixels)=pixels_$uy*(Y_{pos}-Y_{min}-(Y_{range}*Y_{Bcorrection}))/(Y_{range}*(1-Y_{Tcorrection}-Y_{Bcorrection})$ where pixels_uy is the number of display pixels under the active area of the analog resistive screen along the y-axis.

These equations yield corrected, calibrated pixel coordinate estimates.

If it is desired to have the (0,0) position be defined in the upper left instead of the lower left, simply subtract the normalized position from one before multiplying by pixels in software as $Y$ position pixels)=(pixels_$uy*[1-(Y_{pos}-Y_{min}-(Y_{range}*Y_{Bcorrection}))/(Y_{range}*(1-Y_{Tcorrection}-Y_{Bcorrection})]$ The (0,0) position also can be defined in the upper left instead of the lower left by reversing the low and high side drivers for the y-axis so that the higher voltage is applied to the bottom bus bar.

A ratiometric analog-to-digital converter may be used instead of the four analog-to-digital converters and still get the benefits of the corrections by replacing $X_{min}$ and $Y_{min}$ with zero; and replacing $X_{range}$ and $Y_{range}$ with the maximum count output of the analog-to-digital converter.

While the invention is described in connection with one embodiment, it will be understood that the invention is not limited to that one embodiment. On the contrary, the invention covers all alternatives, modifications, and equivalents within the spirit and scope of the appended claims.

For example, some possible alternatives might include the following described below. The shunts may be a resistor (possibly for ESD protection) or some other combination of components to establish pre-defined settling times (discharge rates). The drivers may be some other form of switching circuit besides a bipolar transistor. In the validity algorithm, the y-axis could be driven and sampled before the x-axis. The processor does not have to be one entity. It could comprise multiple hardware units.

Other variations may include the following described below. The validity algorithm, calibration algorithm, and correction algorithm can be integrated with each other to a lesser extent or a greater extent. For example, the three algorithms could essentially be one large algorithm, or they could be three relatively independent algorithms that operate in conjunction with each other.

The validity algorithm may use some other number of multiple samples per axis besides just two samples for determination of a valid pixel coordinate estimate. The validity algorithm may also employ some other form of comparison parameter such as a ratio of the samples instead of a difference, along with an appropriate, corresponding threshold. Similarly, the correction and calibration algorithm may take more than two samples, then use a selected one or more of those samples to determine a coordinate.

"No touch" detection could be done independent of the validity algorithm by just comparing the value of a single pixel coordinate sample to a threshold for determination of a "no touch" state. This may include, for example, that the voltage level sampled across the shunt, when the driver is turned off and the screen is not being touched, is always lower than the voltage level sampled when the driver is turned off and the screen is being touched. In other words, the minimum voltage level sampled corresponding to the minimum pixel location of an axis is greater than the "no touch" voltage level.

In summary, the advantages and features found in at least one embodiment of the invention include among others:

No external procedure or touching of specific areas of the display screen is required to obtain or maintain calibration. Calibration is automatic, continuous and does not interfere with use of the touch-screen display system. A pixel position is generated that is accurate to sub-pixel precision through the life of the touch-screen display system despite temperature variation, humidity variation, aging of components, and initial component variation.

The display active area need not be matched to the active areas of the analog resistive screens. Delays in sampling due to settling times are minimized and effects of noise are minimized. Minimal software filtering of samples is required for accurate and noise free operation. Inexpensive capacitors can be added to the analog interfaces and drivers for ESD protection instead of using, for example, zener diodes (saving ten cents to a dollar per touch screen). This added capacitance increases the settling times of the analog interfaces but the method of sampling and validating the samples eliminates the need to wait until after these settling times before sampling. Lower cost components can be used. For example, a more expensive analog-to-digital converter with ratiometric inputs is not required. The drivers need not be low voltage drop and the driver gain need not be high. The tolerances of the resistance in the wiring, analog resistive screen active areas, and traces need not be tight.

What is claimed is:

1. A method of speeding up the reading of analog to digital converter signals to a touch screen comprising the steps of:
    reading a first coordinate of a coordinate pair at a first time;
    consecutively reading the same coordinate at a second time;
    determining if the absolute value of the difference between the first coordinate and the consecutive coordinate is less than a predetermined value; and
    quantifying, responsive to the difference determining step the coordinate position as a function of the first or the consecutive coordinate.

2. The method of claim 1 wherein the consecutive coordinate is used as the coordinate position.

3. The method of claim 2 wherein the steps are repeated for the other desired coordinate position.

4. The method of claim 2 wherein the steps are repeated for the other desired coordinate position.

5. The method of claim 2 wherein the steps are repeated for the other desired coordinate position.

6. The method of claim 1 wherein the consecutive coordinate is used as the coordinate position.

7. The method of claim 1 wherein the consecutive coordinate is used as the coordinate position.

8. Apparatus speeding up the reading of analog to digital converter signals to a touch screen comprising:
    means for reading a first coordinate of a coordinate pair at a first time;
    means for consecutively reading the same coordinate at a second time;
    means for determining if the absolute value of the difference between the first coordinate and the consecutive coordinate is less than a predetermined value; and
    means, response to the determining means, for quantifying the coordinate position as a function of the first or the consecutive coordinate.

9. The apparatus of claim 8 wherein the consecutive coordinate is used as the coordinate position.

10. The apparatus of claim 8 wherein the consecutive coordinate is used as the coordinate position.

11. A method of eliminating noise from the reading of analog to digital converter signals to a touch screen comprising the steps of:
    reading a first coordinate of a coordinate pair at a first time;
    consecutively reading the same coordinate at a second time;
    determining if the absolute value of the difference between the first coordinate and the consecutive coordinate is less than a predetermined value; and
    quantifying, responsive to the difference determining step the coordinate position as a function of the first or the consecutive coordinate.

12. Apparatus eliminating noise from the reading of analog to digital converter signals to a touch screen comprising:
    means for reading a first coordinate of a coordinate pair at a first time;
    means for consecutively reading the same coordinate at a second time;
    means for determining if the absolute value of the difference between the first coordinate and the consecutive coordinate is less than a predetermined value; and
    means, response to the determining means, for quantifying the coordinate position as a function of the first or the consecutive coordinate.

13. In a touch-screen display system for generating pixel coordinate estimates responsive to a user touching a display screen, an apparatus for enabling detection of a "no touch" state of said touch-screen display system comprising:
    at least one bus bar;
    at least one driver electrically connected to said at least one bus bar to selectively switch said at least one bus bar between at least two of a plurality of electrical potentials wherein the at least one driver is selected to have an off state impedance establishing a pre-determined discharge rate.

14. In a touch-screen display system for generating pixel coordinate estimates responsive to a user touching a display screen, an apparatus for enabling detection of a "no touch" state of said touch-screen display system comprising:
    at least one bus bar;
    at least one driver electrically connected to said at least one bus bar to selectively switch said at least one bus bar between at least two of a plurality of electrical potentials wherein the at least one driver is controlled to establish pre-determined discharge rates.

15. A method of determining whether or not a touch screen has been touched comprising the steps of:
providing an analog to digital converter which supplies an analog to digital reading;
reading a maximum bit level;
determining whether the reading is smaller than the maximum bit level; and
determining the absence of a user touch if the modified reading is less than the maximum bit level.

16. The method of claim 15 wherein the reading step includes the use of a pull up resistor.

17. Apparatus determining whether or not a touch screen has been touched comprising:
means for providing an analog to digital reading from an analog to digital converter;
means for reading a maximum bit level;
means for determining whether the reading is smaller than the maximum bit level; and
means for determining the absence of a user touch if the reading is less than a maximum bit level.

18. The apparatus of claim 17 wherein the providing means includes a pull up resistor.

* * * * *

UNITED STATES PATENT AND TRADEMARK OFFICE
CERTIFICATE OF CORRECTION

| | | |
|---|---|---|
| PATENT NO. | : 7,202,858 B2 | Page 1 of 1 |
| APPLICATION NO. | : 10/779926 | |
| DATED | : April 10, 2007 | |
| INVENTOR(S) | : Jeffrey J. DeGroot and Thomas G. Krajewski | |

It is certified that error appears in the above-identified patent and that said Letters Patent is hereby corrected as shown below:

Column 10, Line 3, "$x_{mas}-x_{min}3$)," should read -- $(x_{mas}-x_{min})$, --.

Signed and Sealed this

Seventh Day of August, 2007

JON W. DUDAS
*Director of the United States Patent and Trademark Office*